United States Patent
Huang et al.

(12) 
(10) Patent No.: US 12,095,727 B2
(45) Date of Patent: Sep. 17, 2024

(54) METHOD FOR SENDING PACKET TRAFFIC AND APPARATUS

(71) Applicant: Huawei Technologies Co., Ltd., Shenzhen (CN)

(72) Inventors: Zhengquan Huang, Beijing (CN); Ningguo Shen, Shenzhen (CN); Qiang Guo, Beijing (CN); Dakun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 17/546,278

(22) Filed: Dec. 9, 2021

(65) Prior Publication Data

US 2022/0103519 A1 Mar. 31, 2022

Related U.S. Application Data

(63) Continuation of application No. PCT/CN2020/095477, filed on Jun. 10, 2020.

(30) Foreign Application Priority Data

Jun. 10, 2019 (CN) .......................... 201910498082.X

(51) Int. Cl.
*H04L 29/06* (2006.01)
*H04L 9/40* (2022.01)

(52) U.S. Cl.
CPC .......... *H04L 63/0227* (2013.01); *H04L 63/10* (2013.01); *H04L 63/1441* (2013.01)

(58) Field of Classification Search
CPC .. H04L 63/0227; H04L 63/10; H04L 63/1441
See application file for complete search history.

(56) References Cited

U.S. PATENT DOCUMENTS

2016/0308763 A1  10/2016  Sindhu et al.
2018/0278523 A1*  9/2018  Ong .................. H04L 45/60
(Continued)

FOREIGN PATENT DOCUMENTS

CN          102740283 A       10/2012
CN          103609070 A        2/2014
(Continued)

OTHER PUBLICATIONS

Lin Cui et al., "Plan: A Policy-Aware VM Management Scheme for Cloud Data Centres," IEEE/ACM 8th International Conference on Utility and Cloud Computing, 2015, 10 pages.
(Continued)

*Primary Examiner* — Tri M Tran
(74) *Attorney, Agent, or Firm* — Conley Rose, P.C.

(57) ABSTRACT

In a method for sending packet traffic, an access device transmits a first part of to-be-transmitted traffic to a forwarding controller for check. After the check is passed, the forwarding controller forwards the first part of the to-be-transmitted traffic. The access device transmits a second part of the to-be-transmitted traffic to a first forwarding node, and the first forwarding node forwards the second part of the to-be-transmitted traffic based on received forwarding indication information and forwarding information of the to-be-transmitted traffic.

28 Claims, 10 Drawing Sheets

(56) References Cited

U.S. PATENT DOCUMENTS

2019/0159106 A1     5/2019  Jin et al.
2020/0322313 A1*   10/2020  Huang .................... H04L 45/74

FOREIGN PATENT DOCUMENTS

| CN | 106101011  A  | 11/2016 |
|----|---------------|---------|
| CN | 107113241  A  |  8/2017 |
| CN | 109496409  A  |  3/2019 |
| EP |   3076706 A1 | 10/2016 |
| EP |   3128697 A1 |  2/2017 |
| WO | 2016163927 A1 | 10/2016 |
| WO | 2018018631 A1 |  2/2018 |

OTHER PUBLICATIONS

Dilip A Joseph et al "A policy-aware switching layer for data centers," SIGCOMM"08 Proceedings, ACM, Seattle, Washington, USA, Aug. 17-22, 2008, 12 pages.

* cited by examiner

METHOD FOR SENDING PACKET TRAFFIC AND APPARATUS

CROSS-REFERENCE TO RELATED APPLICATIONS

This is a continuation of Int'l Patent App. No. PCT/CN2020/095477, filed on Jun. 10, 2020, which claims priority to Chinese Patent App. No. 201910498082.X, filed on Jun. 10, 2019, both of which are incorporated by reference in their entireties.

FIELD

This disclosure relates to the field of network communications, and more specifically, to a method for sending packet traffic, an apparatus, and a computer-readable storage medium.

BACKGROUND

As network security is highly valued, check policies need to be deployed on a network to check access permission of all traffic, security policies, and status of the network.

In a conventional technical solution, check policies are deployed on one network device in a centralized manner, and all traffic in a network is diverted to the network device in a unified manner, so as to check access permission and/or forwarding policies of the traffic. Because the check policies need to be deployed on only one network device, network management can be simplified. However, diverting all the traffic to the network device in a unified manner also causes detour forwarding of some traffic, and consequently increases forwarding pressure of the network device and decreases forwarding efficiency of the entire network.

Therefore, how to reduce traffic detour transmission and a delay and improve a traffic forwarding rate while implementing centralized deployment of check policies becomes a problem that urgently needs to be resolved currently.

SUMMARY

This disclosure provides a method for sending packet traffic and an apparatus, to reduce detour transmission and a delay of traffic, and improve a traffic forwarding rate.

According to a first aspect, a method for sending packet traffic is provided. The method includes: An access device transmits, according to a forwarding path of to-be-transmitted traffic, a first part of the to-be-transmitted traffic to a forwarding controller to perform a check on such as access permission and/or a forwarding policy. After the check is passed, the first part is forwarded to a destination of the to-be-transmitted traffic. The access device transmits a second part of the to-be-transmitted traffic to a first forwarding node. The first forwarding node is located on the forwarding path of the to-be-transmitted traffic, and the first forwarding node sends the second part of the to-be-transmitted traffic to the destination of the to-be-transmitted traffic based on received forwarding indication information.

In the foregoing technical solution, a part of the to-be-transmitted traffic may be transmitted to the forwarding controller for centralized check, and another part of the to-be-transmitted traffic may be forwarded nearby through the selected first forwarding node. The first forwarding node forwards the another part of the to-be-transmitted traffic, to implement centralized deployment of a check policy, reduce forwarding pressure of the forwarding controller, and improve traffic forwarding efficiency.

It should be understood that the second part of the to-be-transmitted traffic is different from the first part of the to-be-transmitted traffic.

It should be further understood that forwarding information of the to-be-transmitted traffic is encapsulated in the to-be-transmitted traffic, and may include but is not limited to: a source Internet Protocol (IP) address, a source port, a destination IP address, a destination port, a protocol type, and the like.

In a possible implementation, the forwarding controller stores network topology information, and the method further includes: After the to-be-transmitted traffic passes the check, the forwarding controller determines the first forwarding node based on the network topology information and the forwarding information of the to-be-transmitted traffic.

The forwarding controller sends the forwarding indication information to the first forwarding node. The forwarding indication information includes the source IP address and the destination IP address of the to-be-transmitted traffic.

In the foregoing technical solution, the forwarding controller selects the first forwarding node based on the stored network topology information and the forwarding information of the to-be-transmitted traffic, and the first forwarding node forwards the second part of the to-be-transmitted traffic nearby. This reduces forwarding pressure of the forwarding controller, improves traffic forwarding efficiency, and reduces a transmission delay.

In another possible implementation, the forwarding controller selects, based on the network topology information and the forwarding information of the to-be-transmitted traffic, a network device that is closest to the forwarding controller as the first forwarding node on the forwarding path of the to-be-transmitted traffic.

In the foregoing technical solution, the network device that is closest to the forwarding controller may be selected as the first forwarding node on the forwarding path of the to-be-transmitted traffic. This covers a relatively large quantity of access devices, and facilitates network management.

In another possible implementation, the forwarding controller selects, based on the network topology information and the forwarding information of the to-be-transmitted traffic, a network device that is closest to the access device as the first forwarding node on the forwarding path of the to-be-transmitted traffic.

In the foregoing technical solution, the network device that is closest to the access device is selected as the first forwarding node on the forwarding path of the to-be-transmitted traffic, so that the to-be-transmitted traffic can be forwarded nearby, thereby improving traffic forwarding efficiency.

In another possible implementation, the forwarding controller selects a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from the first part and the second part.

In another possible implementation, the forwarding controller sends forwarding stop indication information to the first forwarding node. The forwarding stop indication information is used to indicate the first forwarding node to stop sending the third part of the to-be-transmitted traffic to the destination. The forwarding controller sends the forwarding indication information to the second forwarding node.

When the first forwarding node is not suitable for nearby forwarding due to some reasons, for example, when a forwarding capability of the first forwarding node is insufficient, the second forwarding node may further be selected by using the foregoing method to implement nearby traffic forwarding. This improves traffic forwarding efficiency.

In another possible implementation, when a tunnel technology is used to forward traffic, the forwarding controller sends address indication information to the access device. The address indication information is used to indicate an address of the first forwarding node to the access device. The access device establishes a tunnel to the first forwarding node based on the address of the first forwarding node, and the access device transmits the second part of the to-be-transmitted traffic to the first forwarding node through the tunnel.

In another possible implementation, the network topology information is stored in a first controller. When the forwarding controller determines, based on the check policy, that the to-be-forwarded traffic can be forwarded to the destination, the forwarding controller sends check pass indication information to the first controller. The method for sending packet traffic further includes: The first controller receives the check pass indication information sent by the forwarding controller. The check pass indication information is used to indicate that the to-be-transmitted traffic passes the check, and the check pass indication information includes the source IP address and the destination IP address. The first controller determines the first forwarding node based on the network topology information and the check pass indication information. The first controller sends the forwarding indication information to the first forwarding node.

In another possible implementation, the first controller selects, based on the network topology information and the source IP address and the destination IP address of the to-be-transmitted traffic that are included in the check pass indication information, a network device that is closest to the forwarding controller as the first forwarding node on the forwarding path of the to-be-transmitted traffic. In another possible implementation, the first controller selects, based on the network topology information and the source IP address and the destination IP address of the to-be-transmitted traffic that are included in the check pass indication information, a network device that is closest to the access device as the first forwarding node on the forwarding path of the to-be-transmitted traffic.

In another possible implementation, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

Certainly, if a policy or a situation occurs, for example, load of the first forwarding node exceeds a preset threshold, the first controller may further select a second forwarding node to replace the first forwarding node to forward the traffic nearby.

In another possible implementation, the first controller selects a network device that is closest to the first forwarding node as the second forwarding node on a forwarding path from the access device to the forwarding control device. The second forwarding node is configured to forward a third part of the to-be-transmitted traffic, and the third part of the to-be-transmitted traffic is different from the first part and the second part.

In another possible implementation, the first controller sends forwarding stop indication information to the first forwarding node. The forwarding stop indication information is used to indicate the first forwarding node to stop sending the third part of the to-be-transmitted traffic to the destination. The forwarding controller sends the forwarding indication information to the second forwarding node.

According to a second aspect, a method for sending packet traffic is provided, and the method includes: A first controller receives check pass indication information sent by a forwarding controller. A check policy is deployed on the forwarding controller, the check policy is used to check access permission and/or a forwarding policy of to-be-transmitted traffic, the check pass indication information is used to indicate that the to-be-transmitted traffic passes the check, and the check pass indication information includes a source IP address and a destination IP address. The first controller determines a first forwarding node based on network topology information and the check pass indication information. The first controller sends forwarding indication information to the first forwarding node. The forwarding indication information indicates the first forwarding node to send the to-be-transmitted traffic to a destination.

In a possible implementation, the first controller selects, based on the network topology information and the source IP address and the destination IP address of the to-be-transmitted traffic that are included in the check pass indication information, a network device that is closest to the forwarding controller as the first forwarding node on the forwarding path of the to-be-transmitted traffic.

In another possible implementation, the first controller selects, based on the network topology information and the source IP address and the destination IP address of the to-be-transmitted traffic, a network device that is closest to an access device as the first forwarding node on the forwarding path of the to-be-transmitted traffic.

In another possible implementation, the method further includes: The first controller selects a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from a first part and a second part.

In another possible implementation, the first controller sends forwarding stop indication information to the first forwarding node. The forwarding stop indication information is used to indicate the first forwarding node to stop sending the third part of the to-be-transmitted traffic to the destination. The forwarding controller sends the forwarding indication information to the second forwarding node.

In the foregoing solution, flexible implementations are provided for different requirements, and different forwarding nodes may be selected based on requirements to perform nearby forwarding. This relieves forwarding pressure of the forwarding controller.

In another possible implementation, when a tunnel technology is used to forward traffic, the method further includes: The first controller sends address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node through the tunnel.

Optionally, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

According to a third aspect, a method for sending packet traffic is provided, and the method includes:

A forwarding controller checks access permission and/or a forwarding policy of a first part of received to-be-transmitted traffic sent by an access device. After the check is passed, the first part of the to-be-transmitted traffic is forwarded to a destination of the to-be-transmitted traffic.

After the to-be-transmitted traffic passes the check, the forwarding controller determines a first forwarding node based on stored network topology information and a forwarding path of the to-be-transmitted traffic.

The forwarding controller sends forwarding indication information to the first forwarding node. The forwarding indication information includes forwarding information of the to-be-transmitted traffic. The forwarding indication information is used to indicate the first forwarding node to send a second part of the to-be-transmitted traffic to the destination. The second part of the to-be-transmitted traffic is different from the first part of the to-be-transmitted traffic.

In a possible implementation, the forwarding controller selects, based on the network topology information and the forwarding information of the to-be-transmitted traffic, a network device that is closest to the forwarding controller as the first forwarding node on the forwarding path of the to-be-transmitted traffic.

In another possible implementation, the forwarding controller selects, based on the network topology information and the forwarding information of the to-be-transmitted traffic, a network device that is closest to the access device as the first forwarding node on the forwarding path of the to-be-transmitted traffic.

In another possible implementation, the method further includes: The forwarding controller selects a network device that is closest to the first forwarding node as a second forwarding node on a forwarding path from the access device to the forwarding controller. The second forwarding node is configured to forward a third part of the to-be-transmitted traffic, and the third part of the to-be-transmitted traffic is different from the first part and the second part.

In another possible implementation, the method further includes: The forwarding controller sends forwarding stop indication information to the first forwarding node. The forwarding stop indication information is used to indicate the first forwarding node to stop sending the third part of the to-be-transmitted traffic to the destination. The forwarding controller sends the forwarding indication information to the second forwarding node.

In another possible implementation, the method further includes: The forwarding controller sends address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node.

In another possible implementation, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

According to a fourth aspect, a system for sending packet traffic is provided, including: an access device configured to transmit, according to a forwarding path of to-be-transmitted traffic, a first part of the to-be-transmitted traffic to a forwarding controller for check. After the check is passed, the first part is forwarded to a destination of the to-be-transmitted traffic. A check policy is deployed on the forwarding controller, and the check policy is used to check access permission and/or a forwarding policy of the to-be-transmitted traffic.

The access device is further configured to transmit a second part of the to-be-transmitted traffic to a first forwarding node. The first forwarding node is located on the forwarding path of the to-be-transmitted traffic, and the first forwarding node is configured to send the second part of the to-be-transmitted traffic to the destination of the to-be-transmitted traffic based on received forwarding indication information. The forwarding indication information indicates the first forwarding node to send the to-be-transmitted traffic to the destination, and the second part of the to-be-transmitted traffic is different from the first part of the to-be-transmitted traffic.

In another possible implementation, the system further includes a forwarding controller, the forwarding controller stores network topology information, and the forwarding controller is further configured to: after the to-be-transmitted traffic passes the check, determine the first forwarding node based on the network topology information and the forwarding information of the to-be-transmitted traffic; and send the forwarding indication information to the first forwarding node. The forwarding indication information includes a source IP address and a destination IP address of the to-be-transmitted traffic.

In another possible implementation, the forwarding controller is specifically further configured to select, based on the network topology information and the forwarding information of the to-be-transmitted traffic, a network device that is closest to the forwarding controller as the first forwarding node on the forwarding path of the to-be-transmitted traffic.

In another possible implementation, the forwarding controller is further configured to select, based on the network topology information and the forwarding information of the to-be-transmitted traffic, a network device that is closest to the access device as the first forwarding node on the forwarding path of the to-be-transmitted traffic.

In another possible implementation, the forwarding controller is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from the first part and the second part.

In another possible implementation, the forwarding controller is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

In another possible implementation, the forwarding controller is further configured to send address indication information to the access device. The address indication information is used to indicate an address of the first forwarding node to the access device.

The access device is further configured to: establish a tunnel to the first forwarding node based on the address of the first forwarding node, and transmit the second part of the to-be-transmitted traffic to the first forwarding node through the tunnel.

In another possible implementation, the system further includes: a first controller configured to receive check pass indication information sent by the forwarding controller. The check pass indication information is used to indicate that the to-be-transmitted traffic passes the check, and the check pass indication information includes the source IP address and the destination IP address. The first controller is further configured to determine the first forwarding node based on the stored network topology information and the check pass indication information. The first controller is further configured to send the forwarding indication information to the first forwarding node.

In another possible implementation, the first controller is further configured to select, based on the network topology information and the source IP address and the destination IP address of the to-be-transmitted traffic that are included in the check pass indication information, a network device that is closest to the forwarding controller as the first forwarding node on the forwarding path of the to-be-transmitted traffic.

In another possible implementation, the first controller is further configured to select, based on the network topology information and the source IP address and the destination IP address of the to-be-transmitted traffic that are included in the check pass indication information, a network device that is closest to the access device as the first forwarding node on the forwarding path of the to-be-transmitted traffic.

In another possible implementation, the first controller is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from the first part and the second part.

In another possible implementation, the first controller is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

In another possible implementation, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

According to a fifth aspect, a first controller is provided, including: a receiving module configured to receive check pass indication information sent by a forwarding controller, where a check policy is deployed on the forwarding controller, the check policy is used to check access permission and/or a forwarding policy of to-be-transmitted traffic, the check pass indication information is used to indicate that the to-be-transmitted traffic passes the check, and the check pass indication information includes a source IP address and a destination IP address; a determining module configured to determine a first forwarding node based on network topology information and the check pass indication information; and a sending module configured to send forwarding indication information to the first forwarding node, where the forwarding indication information indicates the first forwarding node to send the to-be-transmitted traffic to a destination.

In another possible implementation, the determining module is further configured to select, based on the network topology information and the source IP address and the destination IP address of the to-be-transmitted traffic that are included in the check pass indication information, a network device that is closest to the forwarding controller as the first forwarding node on the forwarding path of the to-be-transmitted traffic.

In another possible implementation, the determining module is further configured to select, based on the network topology information and the source IP address and the destination IP address of the to-be-transmitted traffic that are included in the check pass indication information, a network device that is closest to the access device as the first forwarding node on the forwarding path of the to-be-transmitted traffic.

In another possible implementation, the determining module is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from a first part and a second part.

In another possible implementation, the sending module is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

In another possible implementation, the sending module is further configured to send address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node through the tunnel.

In another possible implementation, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

According to a sixth aspect, a forwarding controller is provided, including: a checking module configured to: check access permission and/or a forwarding policy of a first part of received to-be-transmitted traffic sent by an access device, and after the check is passed, forward the first part of the to-be-transmitted traffic to a destination of the to-be-transmitted traffic; a determining module configured to: after the to-be-transmitted traffic passes the check, determine a first forwarding node based on stored network topology information and a forwarding path of the to-be-transmitted traffic; and a sending module configured to send forwarding indication information to the first forwarding node, where the forwarding indication information includes forwarding information of the to-be-transmitted traffic, the forwarding indication information is used to indicate the first forwarding node to send the to-be-transmitted traffic to the destination, and a second part of the to-be-transmitted traffic is different from the first part of the to-be-transmitted traffic.

In another possible implementation, the determining module is further configured to select, based on the network topology information and the forwarding information of the to-be-transmitted traffic, a network device that is closest to the forwarding controller as the first forwarding node on the forwarding path of the to-be-transmitted traffic.

In another possible implementation, the determining module is further configured to select, based on the network topology information and the forwarding information of the to-be-transmitted traffic, a network device that is closest to the access device as the first forwarding node on the forwarding path of the to-be-transmitted traffic.

In another possible implementation, the determining module is further configured to select a network device that is closest to the first forwarding node as a second forwarding node on a forwarding path from the access device to the forwarding controller. The second forwarding node is configured to forward a third part of the to-be-transmitted traffic, and the third part of the to-be-transmitted traffic is different from the first part and the second part.

In another possible implementation, the sending module is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

In another possible implementation, the sending module is further configured to send address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node.

In another possible implementation, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

According to a seventh aspect, a first controller is provided, including an input/output interface, a processor, and a memory. The processor is configured to control the input/output interface to send and receive information, the memory is configured to store a computer program, and the processor is configured to invoke the computer program from the memory and run the computer program, so that the first controller performs the method according to any one of the second aspect or the possible implementations of the second aspect.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to an eighth aspect, a forwarding controller is provided, including an input/output interface, a processor, and a memory. The processor is configured to control the input/output interface to send and receive information, the memory is configured to store a computer program, and the processor is configured to invoke the computer program from the memory and run the computer program, so that the forwarding controller performs the method according to any one of the third aspect or the possible implementations of the third aspect.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a ninth aspect, a computer program product is provided. The computer program product includes computer program code. When the computer program code is run on a computer, the computer is enabled to perform the methods in the foregoing aspects.

According to a tenth aspect, a computer-readable medium is provided. The computer-readable medium stores program code. When the computer program code is run on a computer, the computer is enabled to perform the methods in the foregoing aspects.

DETAILED DESCRIPTION

The following describes technical solutions with reference to the accompanying drawings.

Figure 1:
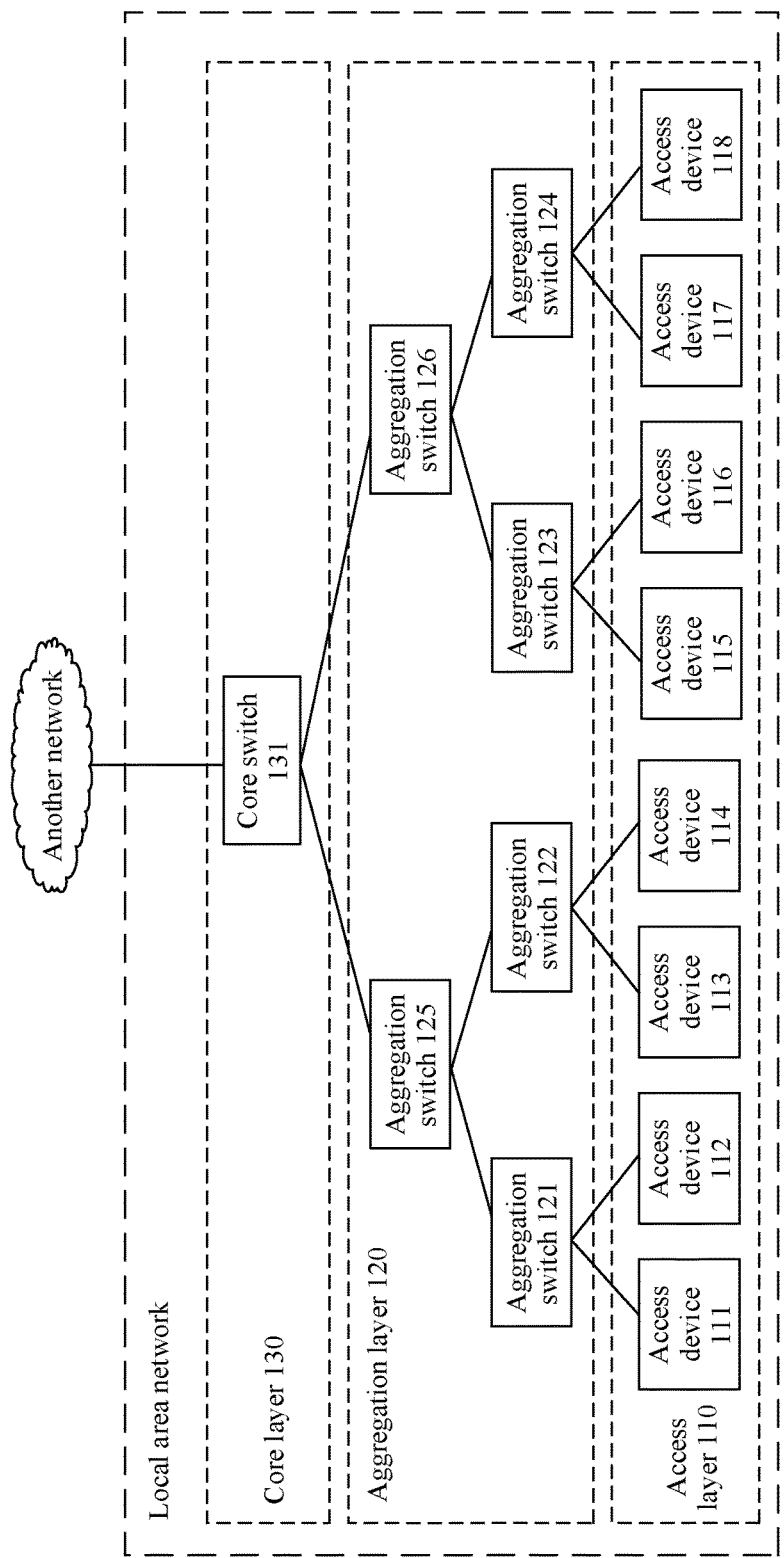
FIG. 1 is a schematic block diagram of a network architecture 100 applied to an embodiment.

FIG. 1 is a schematic block diagram of a network architecture 100 applied to an embodiment. The network architecture 100 shown in FIG. 1 may include an access layer 110, an aggregation layer 120, and a core layer 130.

(1) Access Layer 110:

The access layer 110 generally refers to a part in a local area network that is directly connected to or accessed by a terminal user. The access layer 110 uses a transmission medium such as an optical fiber, a twisted pair, a coaxial cable, or a radio access technology to implement mutual access between a terminal device and a terminal device, or implement a connection between a terminal device and another network outside the local area network, for example, a connection to a public cloud, a data center, or an internet.

The access layer 110 shown in FIG. 1 is provided with a plurality of access devices, for example, an access device 111 to an access device 118 shown in FIG. 1. The access device is not specifically limited in this embodiment, and may be a switch, an access point (AP), or another type of network access device.

The terminal device may access the access device in a wired manner, or may access the access device in a wireless manner. This is not specifically limited in this embodiment.

It should be noted that a quantity of access devices is not specifically limited in this embodiment. In FIG. 1, only eight access devices are used as an example for description.

(2) Aggregation Layer 120:

The aggregation layer 120 may be located between the access layer 110 and the core layer 130, and is an aggregation point of a plurality of access devices. The aggregation layer 120 may perform aggregation processing before traffic of the plurality of access devices is transmitted to the core layer 130, so as to reduce load of the core layer 130. The aggregation layer 120 is provided with a plurality of aggregation switch, for example, an aggregation switch 121 to an aggregation switch 126.

A quantity of aggregation switches is not specifically limited in this embodiment. In FIG. 1, only six aggregation switches are used as an example for description.

(3) Core Layer 130:

The core layer 130, the aggregation layer 120, and the access layer 110 belong to the local area network, and a core switch 131 is disposed at the core layer 130. The core switch 131 may be used as an interface between the local area network and another network (for example, the internet, the data center, or the public cloud), and is responsible for transmitting traffic on the aggregation switch to the another network. In addition, the core switch 130 may transmit traffic on the aggregation switch to another access device in the local area network.

As network security is highly valued, check policies need to be deployed on the network, and access permission and/or forwarding policies of all traffic on the network need to be checked. For example, traffic access permission, traffic security, and traffic forwarding policies may be checked.

According to a method for sending packet traffic provided in this embodiment, a part of to-be-transmitted traffic is transmitted to a forwarding controller deployed with a check policy for centralized check, and another part of the to-be-transmitted traffic may be forwarded nearby through a selected first forwarding node. In this way, centralized deployment of the check policy can be implemented, and the first forwarding node is responsible for forwarding the another part of the to-be-transmitted traffic. This avoids that a relatively large transmission delay is caused because all traffic is aggregated to the forwarding controller, and improves traffic forwarding efficiency.

It should be noted that the forwarding controller in this embodiment may be any network device in the network architecture 100. With reference to the network architecture 100 shown in FIG. 1, an example in which the forwarding controller is the core switch 131, and the check policy is deployed on the core switch 131 is used to describe in detail the method for sending packet traffic.

Figure 2:
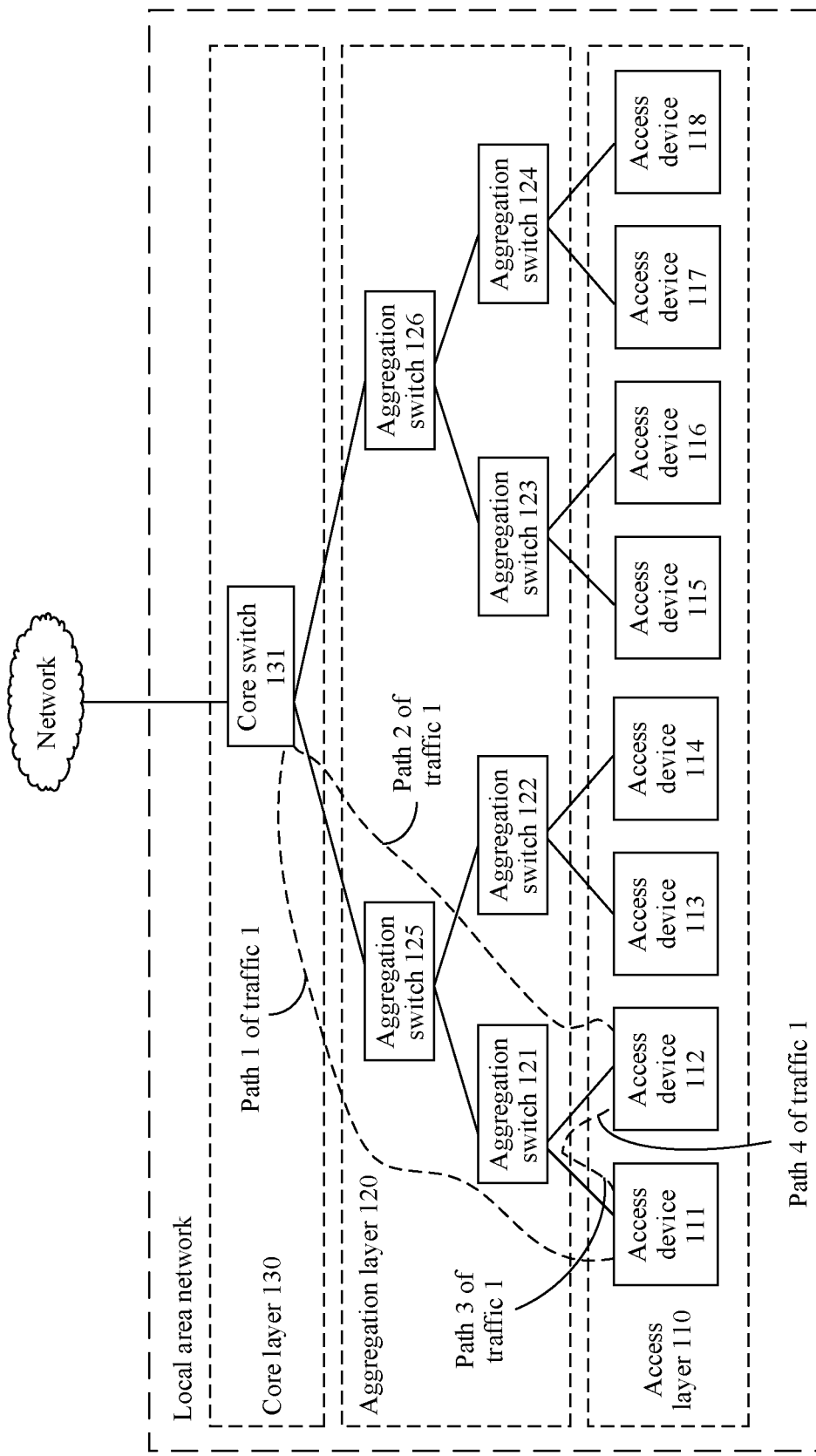
FIG. 2 is a schematic diagram of a forwarding path of traffic 1 in a network architecture 100 according to an embodiment.
Figure 3:
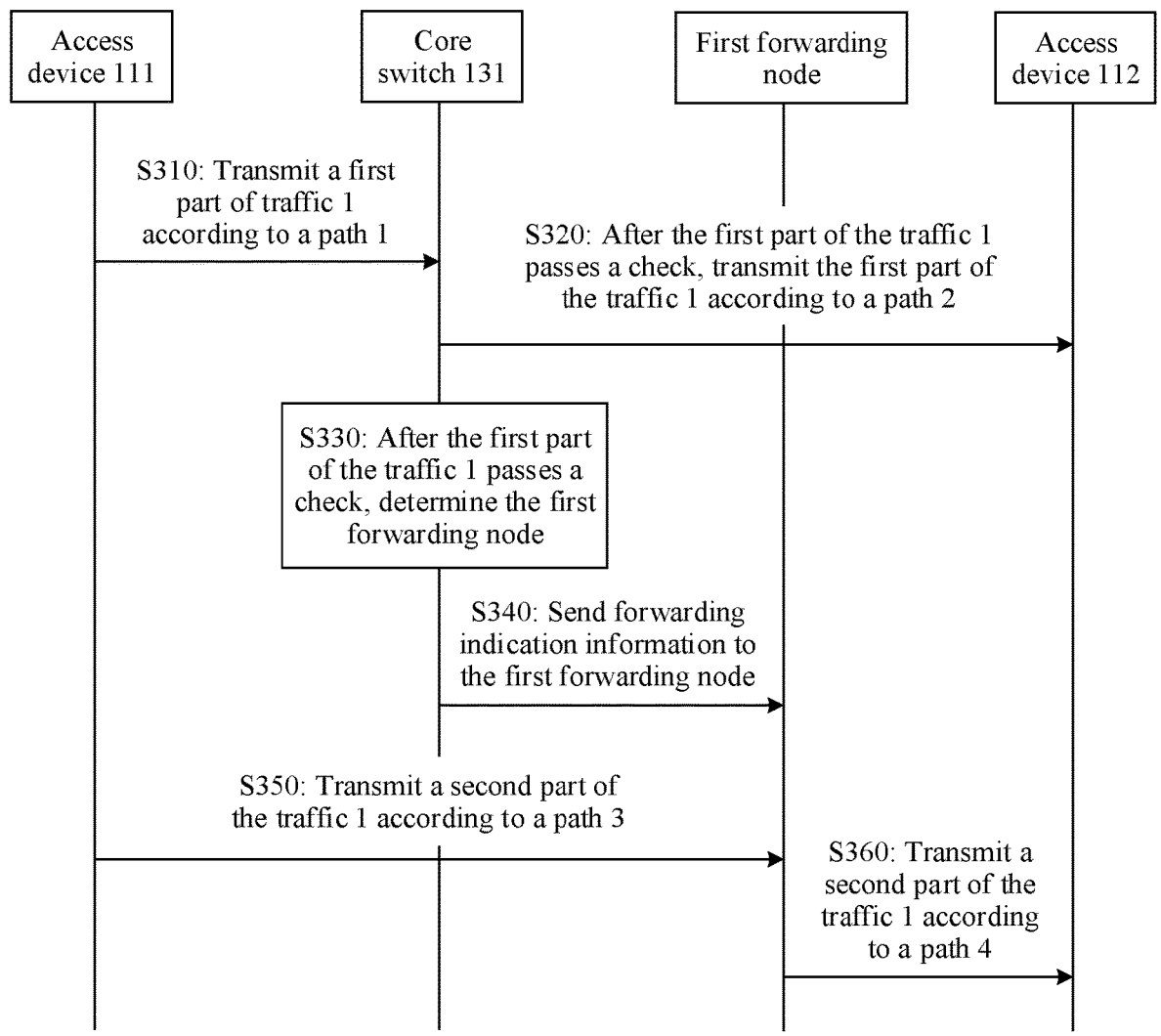
FIG. 3 is a schematic flowchart of a method for sending packet traffic according to an embodiment.
Figure 4:
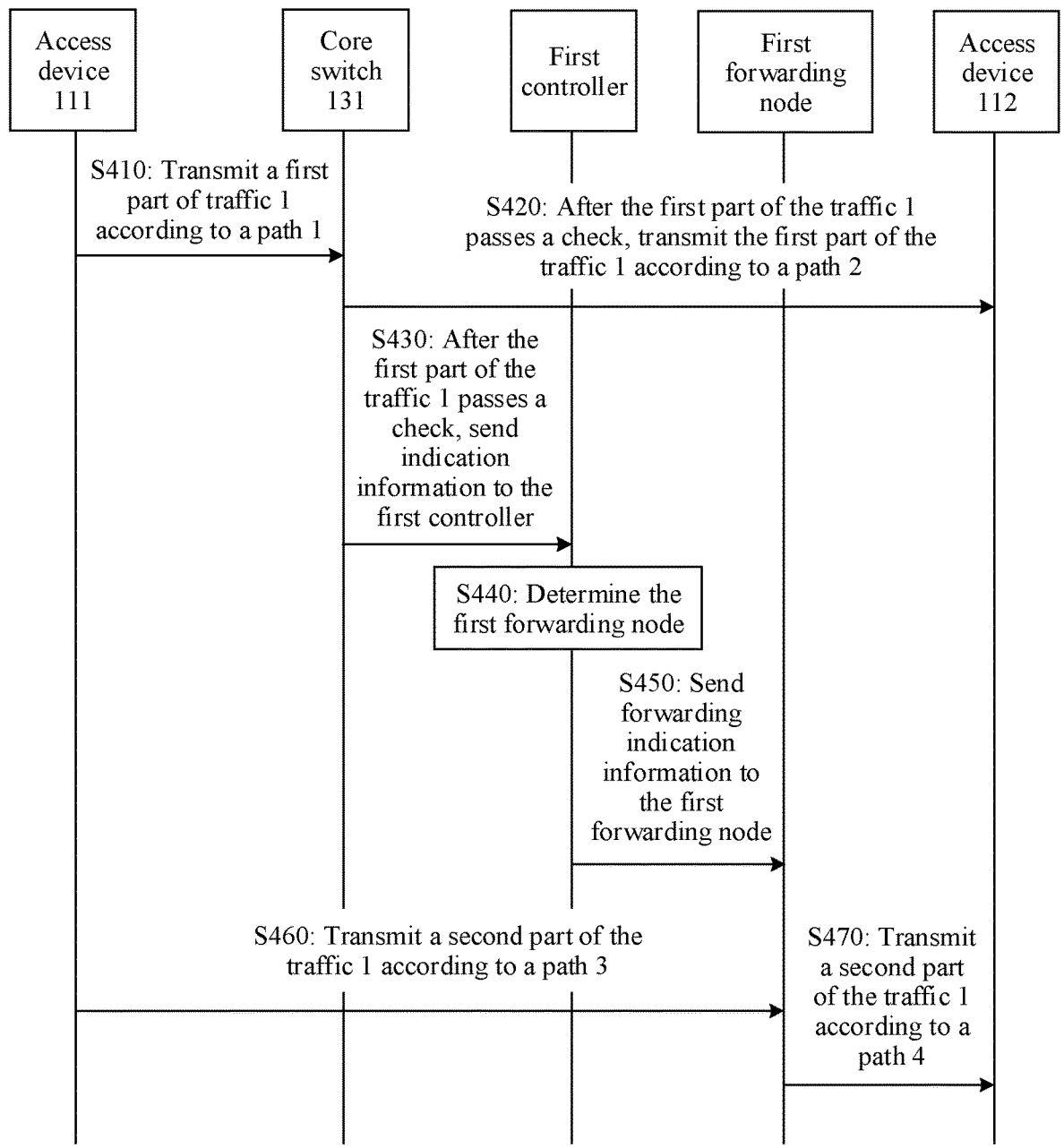
FIG. 4 is a schematic flowchart of another method for sending packet traffic according to an embodiment.

The following uses an example in which to-be-transmitted traffic is traffic 1 that is transmitted from the access device 111 to the access device 112 to describe in detail a specific implementation of forwarding the to-be-transmitted traffic by using a port isolation method with reference to FIG. 2 to FIG. 4.

FIG. 3 is a schematic flowchart of a method for sending packet traffic according to an embodiment. The method shown in FIG. 3 may include steps 310 to 360. With reference to FIG. 2 and FIG. 3, the following separately describes steps 310 to 360 in detail.

Step 310: The access device 111 transmits, according to a path 1, a first part of the to-be-transmitted traffic 1 to the core switch 131 for check.

Refer to FIG. 2. The access device 111 may select to transmit, according to the path 1, the first part of the traffic 1 to the core switch 131 for check. There are a plurality of specific implementations. This is not specifically limited in this embodiment. In a possible implementation, the access device 111 selects to transmit a first packet of the to-be-transmitted traffic 1 to the core switch 131 for check. In another possible implementation, the access device 111 selects to transmit a specified quantity of data packets of the to-be-transmitted traffic 1 to the core switch 131 for check. In another possible implementation, the access device 111 transmits, based on a preset rule, a part of the to-be-transmitted traffic 1 to the core switch 131 for check.

Specifically, port isolation setting may be performed in advance on a forwarding device (for example, the aggregation switch 121 or the aggregation switch 125) between the access device 111 and the core switch 131, so that a network device (for example, the aggregation switch 121 or the aggregation switch 125) on the path 1 transmits, to the core switch 131 for check, the first part of the traffic 1 sent by the access device 111.

For example, a check policy includes checking access permission of the to-be-transmitted traffic. After receiving the first part of the traffic 1, the core switch 131 may determine, based on the fact that a source IP address carried in the traffic 1 is the access device 111 and a destination IP address carried in the traffic 1 is the access device 112, whether the access device 111 has permission to access the access device 112. If the access device 111 has permission to access the access device 112, the access device 111 may send the traffic 1 to the access device 112, that is, check on the traffic 1 is passed.

Step 320: After the check on the traffic 1 is passed, the core switch 131 transmits the first part of the traffic 1 to the access device 112 according to a path 2.

Step 330: The core switch 131 determines a first forwarding node after the check is passed, where the first forwarding node is configured to forward a second part of the traffic 1.

In this embodiment, the core switch 131 stores network topology information. Specifically, each network device in the network architecture 100 shown in FIG. 1 reports a topology structure to the core switch 131. The topology structure may be a connection relationship that is between each network device and another network device and that is reported by each network device, so that the core switch 131 determines network topology information of the network architecture 100 based on the topology structure reported by each network device.

Optionally, in some embodiments, a switch at the aggregation layer 120 may further report device status information to the core switch 131. It should be understood that the device status information may include information such as information indicating whether the switch runs normally, a computing resource and a storage resource of the switch, and a traffic forwarding capability of the switch. An access device at the access layer 110 may further report the device status information and terminal information to the core switch 131. It should be understood that the terminal information may be an IP address, a media access control (MAC) address, a terminal type, an access port, and an access type of a terminal connected to each access device.

In an implementation, the core switch 131 may determine the first forwarding node based on the obtained network topology information and the source IP address and the destination IP address of the to-be-transmitted traffic, and the first forwarding node forwards the second part of the to-be-transmitted traffic. Specifically, the core switch 131 selects, according to a forwarding path from the source IP address to the core switch 131 for the first part of the to-be-transmitted traffic and a forwarding path from the core switch 131 to the destination IP address for the first part of the to-be-transmitted traffic, a network device that passes through both the two paths. The network device may serve as the first forwarding node to forward the second part of the to-be-transmitted traffic.

It should be understood that the network device that passes through both the two paths may be an aggregation switch at the aggregation layer 120, or may be an access device at the access layer. This is specifically related to a forwarding path of the to-be-transmitted traffic, and is not specifically limited.

Figure 5:
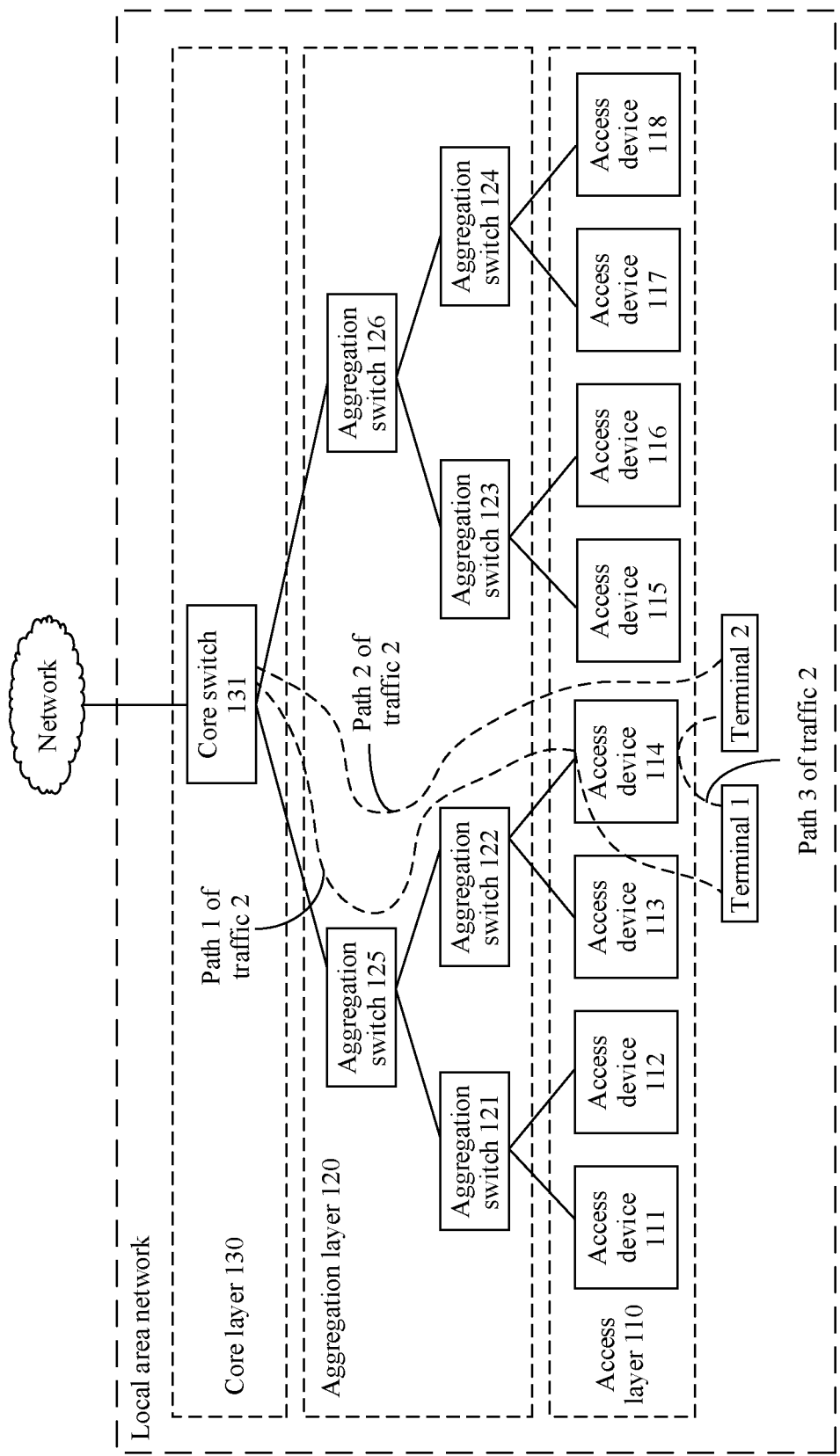
FIG. 5 is a schematic diagram of a forwarding path of traffic 2 in a network architecture 100 according to an embodiment.

In an example, the first forwarding node is an access device, in other words, the access device may forward a packet transmitted between terminal devices connected to the first forwarding node. For traffic of mutual access between terminal devices accessed on a single access device, for example, traffic 2 of mutual access between a terminal 1 and a terminal 2 accessed on the access device 114 shown in FIG. 5, if the access device 114 transmits all traffic 2 to the core switch 131 through the path 1 for check, and after the check is passed, the core switch 131 transmits the traffic 2 to the terminal 2 through the path 2, forwarding efficiency of the traffic 2 is relatively low. In this embodiment, the access device 114 may transmit a first part of the traffic 2 to the core switch 131 through the path 1 for check, and forward the first part of the traffic 2 to the terminal 2 through the path 2. The core switch 131 may further determine, based on a transmission path of the traffic 2, to use the access device 114 as the first forwarding node, and the first forwarding node forwards a second part of the traffic 2. The access device 114 may transmit the second part of the traffic 2 to the access device 114 through the path 3, and the access device 114 forwards the second part of the traffic 2 to the terminal 2 based on a destination IP address of the traffic 2.

In another example, the determined first forwarding node is an aggregation switch. The to-be-transmitted traffic is the traffic 1, and a process in which the core switch 131 determines the first forwarding node is described in detail. The source IP address of the traffic 1 is an IP address of the access device 111, and the destination IP address is an IP address of the access device 112. A forwarding path of the first part of the traffic 1 from the access device 111 to the core switch 131 is the path 1 in FIG. 2, and a forwarding path of the first part of the traffic 1 from the core switch 131 to the access device 112 is the path 2 in FIG. 2. Network devices that pass through the path 1 and the path 2 are as follows:

Path 1 of traffic 1: access device 111→aggregation switch 121→aggregation switch 125→core switch 131

Path 2 of traffic 1: core switch 131→aggregation switch 125→aggregation switch 121→access device 112

The core switch 131 may select, based on network devices that pass through the path 1 and the path 2, network devices that pass through both the path 1 and the path 2. The network devices may serve as the first forwarding node to forward the second part of the traffic 1. Specifically, the network devices that pass through both the path 1 and the path 2 are the aggregation switch 121 and the aggregation switch 125.

An implementation in which the core switch 131 selects the first forwarding node is not specifically limited in this embodiment. In an example, the core switch 131 may determine, based on the network devices that pass through all the forwarding paths of the to-be-transmitted traffic, a network device that is closest to the access device as the first forwarding node. In another example, the core switch 131 may further determine, based on the network devices that pass through all the forwarding paths of the to-be-transmitted traffic, a network device that is closest to the core switch 131 as the first forwarding node.

In a possible implementation, the core switch 131 may preferably select the aggregation switch 121 that is closest to the access device 111 as the first forwarding node on a transmission path of the traffic 1, and the aggregation switch 121 forwards the second part of the traffic 1. In this possible implementation, the selected first forwarding node may implement nearby forwarding of the to-be-transmitted traffic, thereby improving traffic forwarding efficiency and reducing a traffic transmission delay.

In another possible implementation, the core switch 131 may preferably select the aggregation switch 125 that is closest to the core switch 131 as the first forwarding node on a transmission path of the traffic 1, and the aggregation switch 125 forwards the second part of the traffic 1. In this possible implementation, the selected first forwarding node may cover a relatively large quantity of access devices, thereby simplifying network policy deployment.

Optionally, in some embodiments, the core switch 131 may determine, based on a preset condition, whether the first forwarding node needs to forward the second part of the to-be-transmitted traffic.

As an example rather than a limitation, the preset condition is that traffic forwarded by the core switch 131 exceeds or reaches a first preset threshold. For example, when the traffic forwarded by the core switch 131 reaches a preset threshold (for example, 80%), the core switch 131 may determine, according to the foregoing method, the first forwarding node that forwards the second part of the to-be-transmitted traffic.

Step 340: The core switch 131 sends forwarding indication information to the first forwarding node.

For example, the determined first forwarding node is the aggregation switch 121. The core switch 131 may send the forwarding indication information to the aggregation switch 121. The forwarding indication information is used to indicate the aggregation switch 121 to forward the second part of the traffic 1.

It should be understood that the forwarding indication information includes forwarding information of the traffic 1, for example, the source IP address and the destination IP address of the traffic 1, so that the aggregation switch 121 may forward the second part of the traffic 1 to the access device 112 based on the destination IP address of the traffic 1.

Step 350: The aggregation switch 121 receives the second part of the traffic 1 sent by the access device 111.

After receiving the second part of the traffic 1 sent by the access device 111, the aggregation switch 121 determines, based on the source IP address and the destination IP address that are of the to-be-transmitted traffic and that are included in the forwarding indication information sent by the core switch 131 in step 340, that the traffic 1 needs to be forwarded.

Step 360: The first forwarding node forwards the second part of the traffic 1 to the access device 112 according to a path 4.

The aggregation switch 121 forwards, based on the fact that the destination IP address of the traffic 1 indicated in the forwarding indication information is the IP address of the access device 112, the second part of the traffic 1 to the access device 112 according to the path 4.

Optionally, in some embodiments, the network topology information may be further stored on an independent first controller, and the first controller selects the first forwarding node based on the stored network topology information and forwarding information of the to-be-transmitted traffic. The following describes this implementation in detail with reference to FIG. 4.

FIG. 4 is a schematic flowchart of another method for sending packet traffic according to an embodiment. The method shown in FIG. 4 may include steps 410 to 470. The following separately describes steps 410 to 470 in detail.

Step 410: The access device 111 transmits, according to a path 1, a first part of to-be-transmitted traffic 1 to the core switch 131 for check.

The step is corresponding to step 310. For details, refer to the description in step 310. Details are not described herein again.

Step 420: After the check on the traffic 1 is passed, the core switch 131 transmits the first part of the traffic 1 to the access device 112 according to a path 2.

The step is corresponding to step 320. For details, refer to the description in step 320. Details are not described herein again.

Step 430: The core switch 131 sends indication information to a first controller after the check is passed, where the indication information is used to indicate that the traffic 1 passes the check.

In this embodiment, the first controller may be an independent server, and the first controller may be implemented in a physical host manner, or may be implemented in a virtual machine manner.

The first controller stores network topology information. Specifically, each network device in the network architecture 100 shown in FIG. 1 reports a topology structure to the first controller. The topology structure may be a connection relationship that is between each network device and another network device and that is reported by each network device, so that the first controller determines network topology information of the network architecture 100 based on the topology structure reported by each network device.

Optionally, in some embodiments, a switch at the aggregation layer 120 may further report device status information to the first controller. It should be understood that the device status information may include information such as whether the switch runs normally, a computing resource and a storage resource of the switch, and a traffic forwarding capability of the switch. An access device at the access layer 110 may further report the device status information and terminal information to the first controller. It should be understood that the terminal information may be an IP, a MAC address, a terminal type, an access port, and an access type of a terminal connected to each access device.

It should be understood that the indication information sent by the core switch 131 to the first controller includes forwarding information of the traffic 1, for example, a source IP address of the traffic 1 is an IP address of the access device 111, and a destination IP address of the traffic 1 is an IP address of the access device 112.

Step 440: The first controller determines a first forwarding node after receiving the indication information, where the first forwarding node is configured to forward a second part of the traffic 1.

After receiving the indication information sent by the core switch 131, the first controller may determine that the traffic 1 passes the check of the core switch 131. The first controller may further determine the first forwarding node based on the network topology information and the source IP address and the destination IP address of the traffic 1 that are obtained in the foregoing step, and the first forwarding node forwards a second part of the to-be-transmitted traffic.

In this embodiment, a method for selecting the first forwarding node by the first controller is similar to a process in which the core switch 131 selects the first forwarding node. For details, refer to the foregoing implementation process in which the core switch 131 selects the first forwarding node. Details are not described herein again.

Step 450: The first controller sends forwarding indication information to the first forwarding node.

For example, the determined first forwarding node is the aggregation switch 121. The first controller may send the forwarding indication information to the aggregation switch 121. The forwarding indication information is used to indicate the aggregation switch 121 to forward the second part of the traffic 1.

It should be understood that the forwarding indication information includes forwarding information of the traffic 1, for example, the source IP address and the destination IP address of the traffic 1, so that the aggregation switch 121 may forward the second part of the traffic 1 to the access device 112 based on the destination IP address of the traffic 1.

Step 460: The aggregation switch 121 receives the second part of the traffic 1 sent by the access device 111.

After receiving the second part of the traffic 1 sent by the access device 111, the aggregation switch 121 determines, based on the source IP address and the destination IP address that are of the to-be-transmitted traffic and that are included in the forwarding indication information sent by the first controller in step 450, that the traffic 1 needs to be forwarded.

Step 470: The first forwarding node forwards the second part of the traffic 1 to the access device 112 according to a path 4.

As the first forwarding node, after receiving the forwarding indication information sent by the first controller, the aggregation switch 121 forwards, based on the fact that the destination IP address of the traffic 1 indicated in the forwarding indication information is the IP address of the access device 112, the second part of the traffic 1 to the access device 112 according to the path 4.

Figure 6:
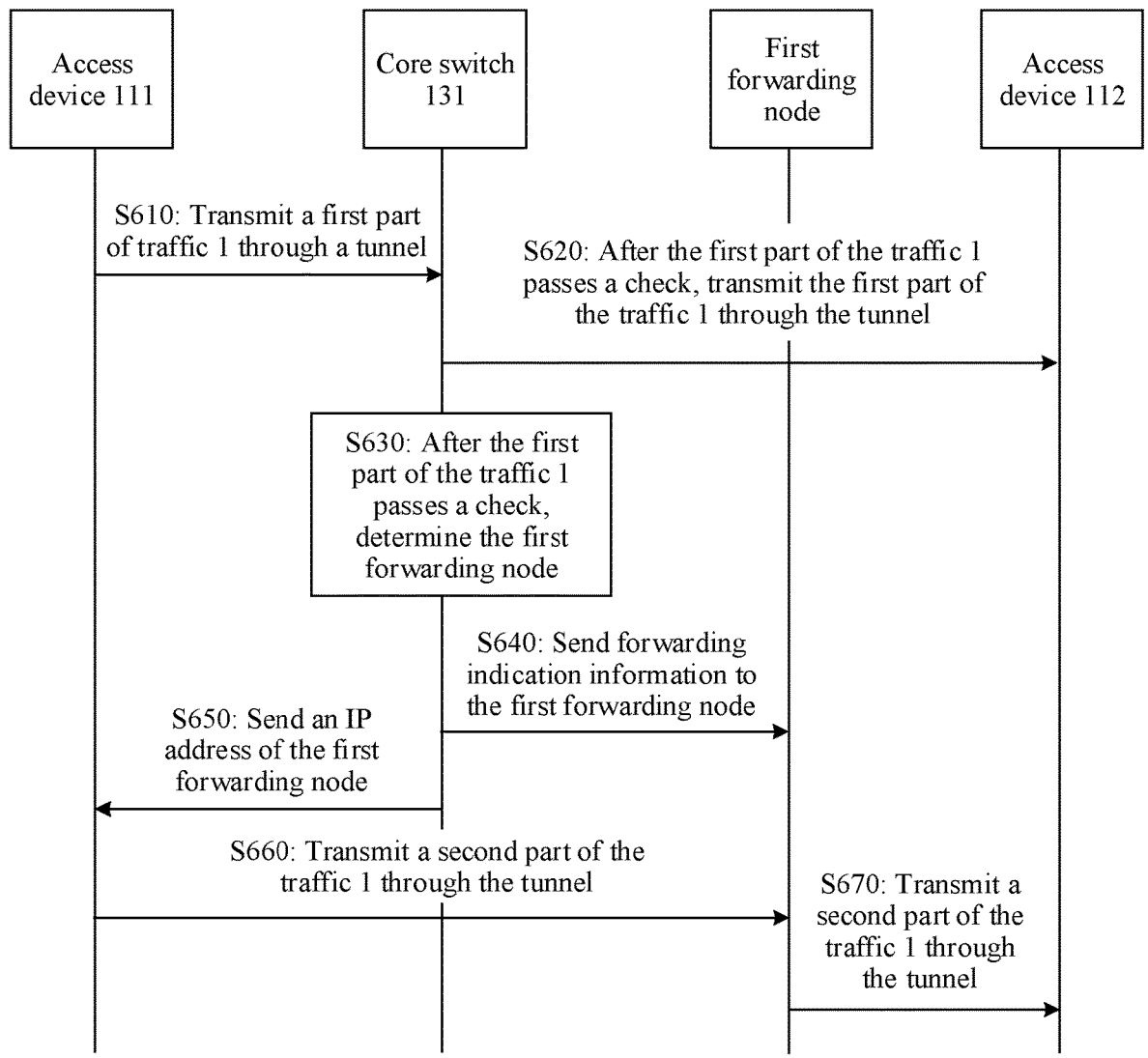
FIG. 6 is a schematic flowchart of another method for sending packet traffic according to an embodiment.
Figure 7:
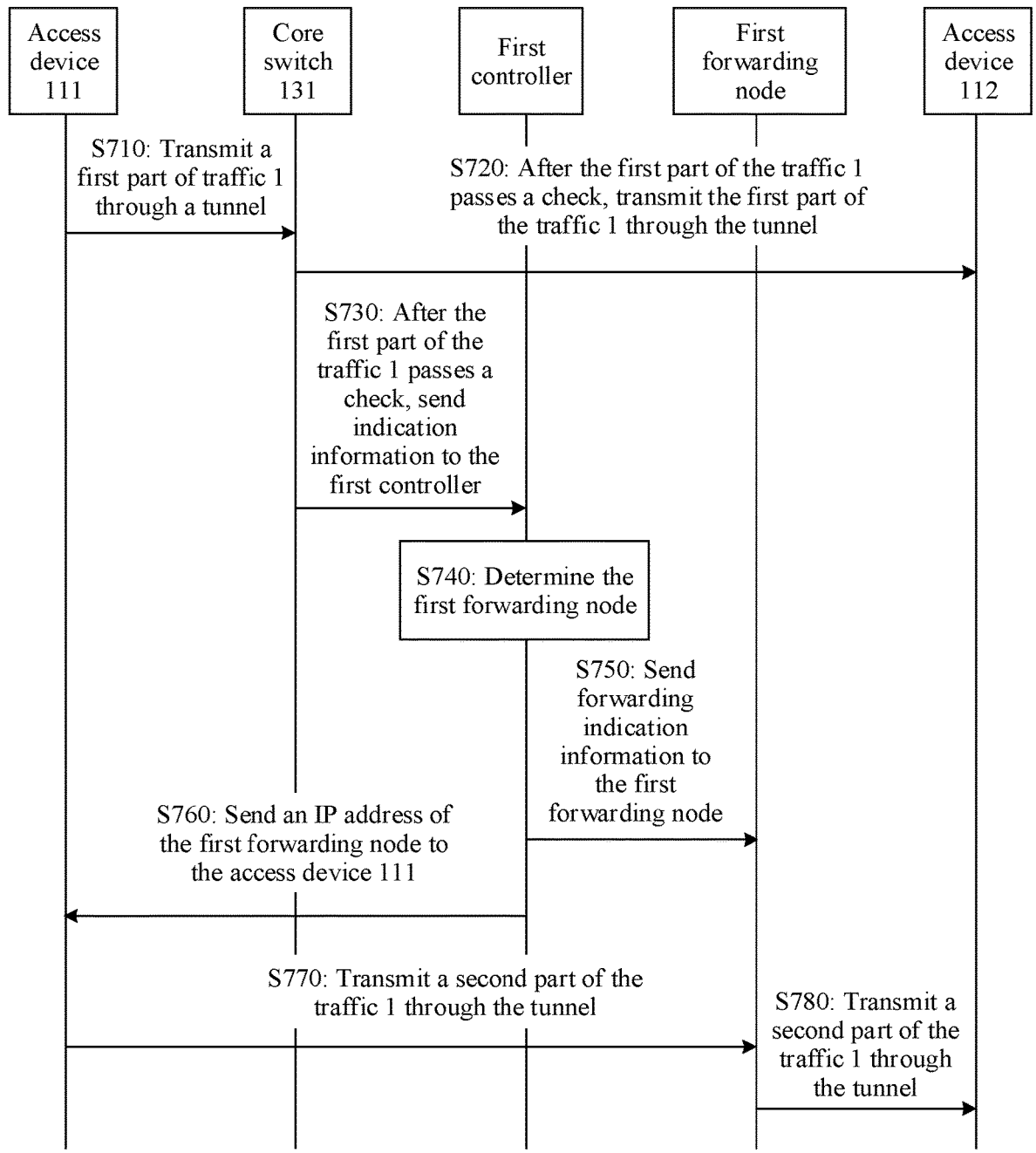
FIG. 7 is a schematic flowchart of another method for sending packet traffic according to an embodiment.

The following uses an example in which to-be-transmitted traffic is traffic 1 that is transmitted from the access device 111 to the access device 112 to describe in detail a specific implementation of forwarding the to-be-transmitted traffic by using a tunnel technology with reference to FIG. 6 and FIG. 7.

FIG. 6 is a schematic flowchart of another method for sending packet traffic according to an embodiment. The method shown in FIG. 6 may include steps 610 to 670. The following separately describes steps 610 to 670 in detail.

Step 610: The access device 111 transmits, by using a tunnel technology, a first part of to-be-transmitted traffic 1 to the core switch 131 for check.

A Virtual eXtensible Local Area Network (VXLAN) tunnel is used as an example. A process of creating the tunnel may be obtaining a VXLAN tunnel endpoint (VTEP), for example, an IP address of the VXLAN tunnel endpoint, and encapsulating the to-be-transmitted traffic based on the obtained IP address of the VXLAN tunnel endpoint. Specifically, a source address and a destination address may be encapsulated in an outer layer of the to-be-transmitted traffic. For example, an IP address of a device sending the to-be-transmitted traffic may be filled in a source address field, and the obtained IP address of the VXLAN tunnel endpoint may be filled in a destination address field. Therefore, the to-be-transmitted traffic is transmitted to the destination encapsulated at the outer layer according to the IP address in the destination address field of the outer layer of the to-be-transmitted traffic.

Refer to FIG. 2. The core switch 131 may broadcast an IP address of the core switch 131 to each network device in the network architecture 100 shown in FIG. 1. When the access device 111 needs to send the first part of the traffic 1 to the core switch 131 for check, the access device 111 may encapsulate the first part of the traffic 1 based on the IP address broadcast by the core switch 131, and transmit the encapsulated first part of the traffic 1 to the core switch 131. For example, the access device 111 may encapsulate an IP address of the access device 111 into the source address field at the outer layer of the to-be-transmitted traffic, and encapsulate the IP address of the core switch 131 into the destination address field at the outer layer of the to-be-transmitted traffic.

The aggregation switch 121 receives the first part of the traffic 1 transmitted by the access device 111, and when the aggregation switch 121 finds that the destination address field encapsulated at the outer layer of the traffic 1 is the IP address of the core switch 131 instead of an IP address of the aggregation switch 121, the aggregation switch 121 forwards the first part of the traffic 1 to a next hop that can reach the core switch 131. Similarly, after receiving the first part of the traffic 1 transmitted by the access device 111, the aggregation switch 125 finds that the destination address field encapsulated at the outer layer of the traffic 1 is the IP address of the core switch 131, and transmits the first part of the traffic 1 to the core switch 131.

Step 620: After the check on the traffic 1 is passed, the core switch 131 transmits the first part of the traffic 1 to the access device 112.

The core switch 131 receives the encapsulated first part of the traffic 1, decapsulates the first part of the traffic 1 based on the fact that the destination IP address encapsulated at the outer layer of the first part of the traffic 1 is the IP address of the core switch 131, and obtains that the destination address of the decapsulated first part of the traffic 1 is the access device 112. After the check on the first part of the traffic 1 is passed, the core switch 131 may forward, based on the destination address (that is, an address of the access device 112) of the first part of the traffic 1, the first part of the traffic 1 to the access device 112 by using a route.

Step 630: The core switch 131 determines a first forwarding node after the check on the traffic 1 is passed, where the first forwarding node is configured to forward a second part of the traffic 1.

In this embodiment, the core switch 131 stores network topology information. After the first part of the traffic 1 passes the check, the core switch 131 may further select, according to a forwarding path that is of the traffic 1 from the source IP address to the core switch 131 and a forwarding path that is of a first part of the to-be-transmitted traffic from the core switch 131 to the destination IP address, a network device that passes through both the two paths. The network device may serve as the first forwarding node to forward the second part of the to-be-transmitted traffic.

A specific method for determining the first forwarding node is similar to step 330. For details, refer to the description in step 330. Details are not described herein again.

Step 640: The core switch 131 sends forwarding indication information to the first forwarding node.

For example, the determined first forwarding node is the aggregation switch 121. The core switch 131 may send the forwarding indication information to the aggregation switch 121. The forwarding indication information is used to indicate the aggregation switch 121 to forward the second part of the traffic 1.

It should be understood that the forwarding indication information includes forwarding information of the traffic 1, for example, the source IP address and the destination IP address of the traffic 1, so that the aggregation switch 121 may forward the second part of the traffic 1 to the access device 112 based on the destination IP address of the traffic 1.

Step 650: The core switch 131 sends an IP address of the first forwarding node to the access device 111.

For example, the determined first forwarding node is the aggregation switch 121. The core switch 131 sends the IP address of the aggregation switch 121 to the access device 111, so that the access device 111 encapsulates the second part of the traffic 1 based on the IP address of the aggregation switch 121, to establish a VXLAN tunnel between the access device 111 and the aggregation switch 121, and transmit the second part of the traffic 1 to the aggregation switch 121 through the VXLAN tunnel.

Specifically, the access device 111 encapsulates the second part of the traffic 1 based on the obtained IP address of the first forwarding node. For example, the access device 111 may encapsulate the IP address of the access device 111 into the source address field at the outer layer of the to-be-transmitted traffic, and encapsulate the IP address of the first forwarding node (the aggregation switch 121) into the destination address field at the outer layer of the to-be-transmitted traffic.

Step 660: The first forwarding node receives the second part of the traffic 1 sent by the access device 111.

For example, the determined first forwarding node is the aggregation switch 121. The aggregation switch 121 receives the encapsulated second part of the traffic 1, finds that the destination address field encapsulated at the outer layer of the traffic 1 is the IP address of the aggregation switch 121, decapsulates the second part of the traffic 1 to obtain the decapsulated second part of the traffic 1, and finds that the destination address of the decapsulated first part of the traffic 1 is the access device 112.

Step 670: The first forwarding node forwards the second part of the traffic 1.

For example, the determined first forwarding node is the aggregation switch 121. The aggregation switch 121 forwards, based on the forwarding indication information obtained in step 640 and based on the fact that the destination address of the decapsulated first part of the traffic 1 is the access device 112, the second part of the traffic 1 to the access device 112 by using the route.

Optionally, in some embodiments, the network topology information is stored on an independent first controller, the first controller selects the first forwarding node based on the stored network topology information and forwarding information of the to-be-transmitted traffic, and the first forwarding node transmits the second part of the to-be-transmitted traffic through a tunnel. The following describes this implementation in detail with reference to FIG. 6.

FIG. 7 is a schematic flowchart of another method for sending packet traffic according to an embodiment. The method shown in FIG. 7 may include steps 710 to 780. The following separately describes steps 710 to 780 in detail.

Step 710: The access device 111 transmits, by using a tunnel technology, a first part of to-be-transmitted traffic 1 to the core switch 131 for check.

The step is corresponding to step 610. For details, refer to the description in step 610. Details are not described herein again.

Step 720: After the check on the traffic 1 is passed, the core switch 131 transmits the first part of the traffic 1 to the access device 112 through a tunnel.

The step is corresponding to step 620. For details, refer to the description in step 620. Details are not described herein again.

Step 730: The core switch 131 sends indication information to a first controller after the check on the traffic 1 is passed, where the indication information is used to indicate that the traffic 1 passes the check.

Step 740: The first controller determines a first forwarding node after receiving the indication information, where the first forwarding node is configured to forward a second part of the traffic 1.

After receiving the indication information sent by the core switch 131, the first controller may determine that the traffic 1 passes the check of the core switch 131. The first controller may further determine the first forwarding node based on network topology information and a source IP address and a destination IP address of the traffic 1 that are obtained in the foregoing step, and the first forwarding node forwards a second part of the to-be-transmitted traffic.

A specific method for determining the first forwarding node is similar to step 330. For details, refer to the description in step 330. Details are not described herein again.

Step 750: The first controller sends forwarding indication information to the first forwarding node.

For example, the determined first forwarding node is the aggregation switch 121. The first controller may send the forwarding indication information to the aggregation switch 121. The forwarding indication information is used to indicate the aggregation switch 121 to forward the second part of the traffic 1.

It should be understood that the forwarding indication information includes forwarding information of the traffic 1, for example, the source IP address and the destination IP address of the traffic 1, so that the aggregation switch 121 may forward the second part of the traffic 1 to the access device 112 based on the destination IP address of the traffic 1.

Step 760: The first controller sends an IP address of the first forwarding node to the access device 111.

The step is corresponding to step 650. For details, refer to the description in step 650. Details are not described herein again.

Step 770: The first forwarding node receives the second part of the traffic 1 sent by the access device 111.

The step is corresponding to step 660. For details, refer to the description in step 660. Details are not described herein again.

Step 780: The first forwarding node forwards the second part of the traffic 1.

Optionally, in this embodiment, according to the foregoing method, the first forwarding node is selected to forward the second part of the to-be-transmitted traffic, and a second forwarding node may be further determined based on a load status of the first forwarding node. For example, a forwarding controller stores the network topology information. The forwarding controller may select a network device that is closest to the first forwarding node as the second forwarding node on a forwarding path from an access device to the forwarding controller, and the second forwarding node sends a third part of the to-be-transmitted traffic to a destination of the to-be-transmitted traffic. The third part of the to-be-transmitted traffic is different from the first part and the second part.

The following uses an example in which the to-be-transmitted traffic is forwarded by using a port isolation method to describe in detail a specific implementation in which the second forwarding node sends the third part of the to-be-transmitted traffic to the destination of the to-be-transmitted traffic.

In a possible implementation, the to-be-transmitted traffic is the traffic 1 transmitted from the access device 111 to the access device 112, and the first forwarding node selected by the forwarding controller to forward the second part of the to-be-transmitted traffic is the aggregation switch 121. The forwarding controller may further select, on a path 1 between the access device 111 and the core switch 131, a network device that is closest to the first forwarding node (for example, the aggregation switch 121) as the second forwarding node, for example, select the aggregation switch 125 that is closest to the aggregation switch 121 as the second forwarding node, and send the forwarding indication information to the second forwarding node (the aggregation switch 125), where the forwarding indication information is used to indicate the second forwarding node to send the third part of the to-be-transmitted traffic to the destination of the to-be-transmitted traffic. Because the second forwarding node is on a path between the first forwarding node and the forwarding controller, after selecting the aggregation switch 125 as the second forwarding node, the forwarding controller may further send forwarding stop indication information to the first forwarding node (the aggregation switch 121). The forwarding stop indication information is used to indicate the first forwarding node (the aggregation switch 121) not to send the third part of the to-be-transmitted traffic to the destination. It may also be understood that after receiving the forwarding stop indication information, the first forwarding node (the aggregation switch 121) performs port isolation on the received to-be-transmitted traffic based on the forwarding stop indication information, and sends the to-be-transmitted traffic to the aggregation switch 125 according to the forwarding path. After receiving the to-be-transmitted traffic, the aggregation switch 125 performs nearby forwarding based on the forwarding indication information, and sends the third part of the to-be-transmitted traffic to the destination of the to-be-transmitted traffic.

In another possible implementation, the to-be-transmitted traffic is the traffic 1 transmitted from the access device 111 to the access device 112, and the first forwarding node selected by the forwarding controller to forward the second part of the to-be-transmitted traffic is the aggregation switch 125. The forwarding controller may further select, on a path 1 between the access device 111 and the core switch 131, a network device that is closest to the first forwarding node (for example, the aggregation switch 125) as the second forwarding node, for example, select the aggregation switch 121 that is closest to the aggregation switch 125 as the second forwarding node, and send the forwarding indication information to the second forwarding node (the aggregation switch 121), where the forwarding indication information is used to indicate the second forwarding node to send the third part of the to-be-transmitted traffic to the destination of the to-be-transmitted traffic. Because the second forwarding node is on a path between the first forwarding node and the access device 111, port isolation is preset on the second forwarding node. After receiving the to-be-transmitted traffic sent by the access device 111, the second forwarding node (the aggregation switch 121) cancels port isolation based on the forwarding indication information, and forwards the traffic nearby, that is, sends the third part of the to-be-transmitted traffic to the destination of the to-be-transmitted traffic.

The foregoing describes in detail the method for sending packet traffic provided in the embodiments with reference to FIG. 1 to FIG. 7. The following describes in detail apparatus embodiments with reference to FIG. 8 to FIG. 12. It should be understood that the descriptions of the method embodiments correspond to the descriptions of the apparatus embodiments. Therefore, for a part that is not described in detail, refer to the foregoing method embodiments.

Figure 8:
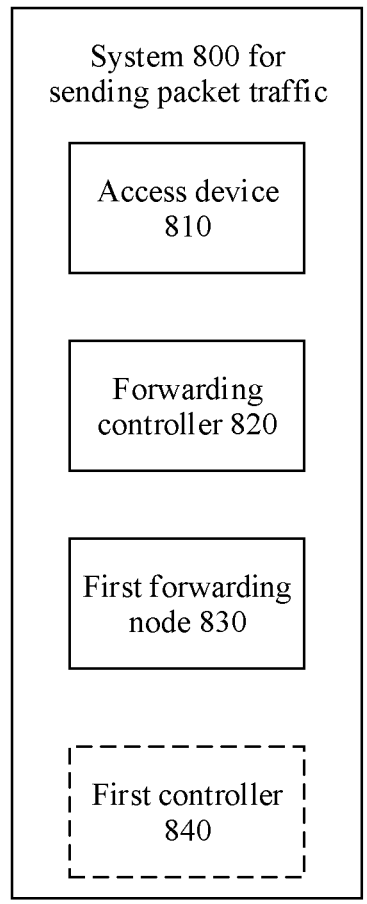
FIG. 8 is a schematic block diagram of a system 800 for sending packet traffic according to an embodiment.

FIG. 8 is a schematic block diagram of a system 800 for sending packet traffic according to an embodiment. The system 800 may include an access device 810, a forwarding controller 820, and a first forwarding node 830.

Optionally, in some embodiments, the system 800 may further include a first controller 840.

The access device 810 may be corresponding to an access device at the access layer 110 shown in FIG. 1. For details, refer to the access device at the access layer 110 described in the foregoing steps.

The forwarding controller 820 may be corresponding to the core switch 131 shown in FIG. 1. For details, refer to the foregoing description of the core switch 131. Details are not described herein again.

The first forwarding node 830 may be an access device at the access layer 110 shown in FIG. 1, or may be a switch at the aggregation layer 120, or may be the core switch 131 at the core layer 130. Selection of the first forwarding node 830 is related to network topology information and a forwarding path of to-be-transmitted traffic. For details, refer to the foregoing description of selecting the first forwarding node. Details are not described herein again.

The first controller 840 is an independent server, may be a physical machine, or may be a virtual machine. For details, refer to the foregoing description of the first controller. Details are not described herein again.

Specifically, the access device 810 transmits, according to the forwarding path of the to-be-transmitted traffic, a first part of the to-be-transmitted traffic to the forwarding controller 820 for check. After the check is passed, the first part is forwarded to a destination of the to-be-transmitted traffic. A check policy is deployed on the forwarding controller, and the check policy is used to check access permission and/or a forwarding policy of the to-be-transmitted traffic.

The access device 810 transmits a second part of the to-be-transmitted traffic to the first forwarding node. The first forwarding node is located on the forwarding path of the to-be-transmitted traffic, and the first forwarding node is configured to send the second part of the to-be-transmitted traffic to the destination of the to-be-transmitted traffic based on received forwarding indication information. The forwarding indication information indicates the first forwarding node to send the to-be-transmitted traffic to the destination, and the second part of the to-be-transmitted traffic is different from the first part of the to-be-transmitted traffic.

Optionally, the forwarding controller 820 stores the network topology information, and the forwarding controller 820 is further configured to: after the to-be-transmitted traffic passes the check, determine the first forwarding node based on the network topology information and the forwarding path of the to-be-transmitted traffic; and send the forwarding indication information to the first forwarding node. The forwarding indication information includes a source IP address and a destination IP address of the to-be-transmitted traffic.

Optionally, the forwarding controller 820 is further configured to select, based on the network topology information and the forwarding path of the to-be-transmitted traffic, a network device that is closest to the forwarding controller as the first forwarding node on the forwarding path of the to-be-transmitted traffic.

Optionally, the forwarding controller 820 is further configured to select, based on the network topology information and the forwarding path of the to-be-transmitted traffic, a network device that is closest to the access device as the first forwarding node on the forwarding path of the to-be-transmitted traffic.

Optionally, the forwarding controller 820 is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from the first part and the second part.

Optionally, the forwarding controller 820 is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

Optionally, the forwarding controller 820 is further configured to send address indication information to the access device. The address indication information is used to indicate an address of the first forwarding node to the access device. The access device is further configured to: establish a tunnel to the first forwarding node based on the address of the first forwarding node, and transmit the second part of the to-be-transmitted traffic to the first forwarding node through the tunnel.

Optionally, the first controller 840 is configured to receive check pass indication information sent by the forwarding controller. The check pass indication information is used to indicate that the to-be-transmitted traffic passes the check, and the check pass indication information includes the source IP address and the destination IP address. The first controller 830 is further configured to determine the first forwarding node based on the stored network topology information and the check pass indication information. The first controller 830 is further configured to send the forwarding indication information to the first forwarding node.

Optionally, the first controller 830 is further configured to select, based on the network topology information and the source IP address and the destination IP address of the to-be-transmitted traffic that are included in the check pass indication information, a network device that is closest to the forwarding controller as the first forwarding node on the forwarding path of the to-be-transmitted traffic.

Optionally, the first controller 830 is further configured to select, based on the network topology information and the source IP address and the destination IP address of the to-be-transmitted traffic that are included in the check pass indication information, a network device that is closest to the access device as the first forwarding node on the forwarding path of the to-be-transmitted traffic.

Optionally, the first controller 830 is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from the first part and the second part.

Optionally, the first controller 830 is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

Optionally, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

Figure 9:
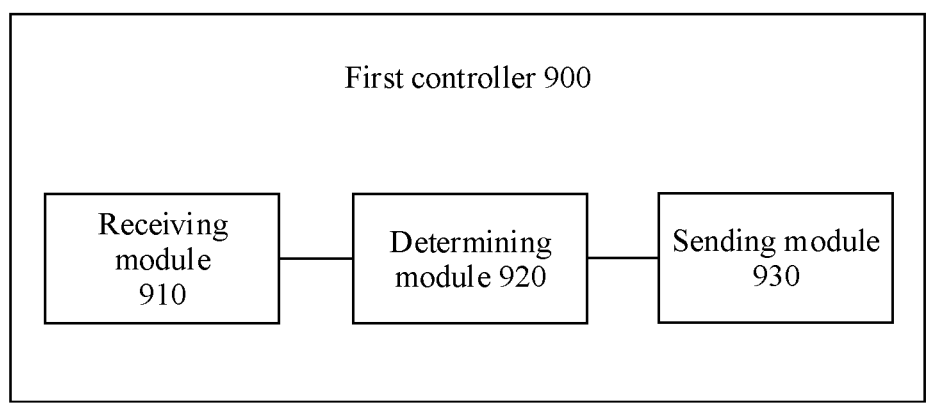
FIG. 9 is a schematic block diagram of a first controller 900 according to an embodiment.

FIG. 9 is a schematic block diagram of a first controller 900 according to an embodiment. The first controller 900 includes: a receiving module 910 configured to receive check pass indication information sent by a forwarding controller, where a check policy is deployed on the forwarding controller, the check policy is used to check access permission and/or a forwarding policy of to-be-transmitted traffic, the check pass indication information is used to indicate that the to-be-transmitted traffic passes the check, and the check pass indication information includes a source IP address and a destination IP address; a determining module 920 configured to determine a first forwarding node based on network topology information and the check pass indication information; and a sending module 930 configured to send forwarding indication information to the first forwarding node, where the forwarding indication information indicates the first forwarding node to send the to-be-transmitted traffic to a destination.

Optionally, the determining module 920 is further configured to select, based on the network topology information and the source IP address and the destination IP address of the to-be-transmitted traffic that are included in the check pass indication information, a network device that is closest to the forwarding controller as the first forwarding node on the forwarding path of the to-be-transmitted traffic.

Optionally, the determining module 920 is further configured to select, based on the network topology information and the source IP address and the destination IP address of the to-be-transmitted traffic that are included in the check pass indication information, a network device that is closest to an access device as the first forwarding node on the forwarding path of the to-be-transmitted traffic.

Optionally, the determining module 920 is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from a first part and a second part.

Optionally, the sending module 930 is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

Optionally, the sending module 930 is further configured to send address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node through the tunnel.

Optionally, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

Figure 10:
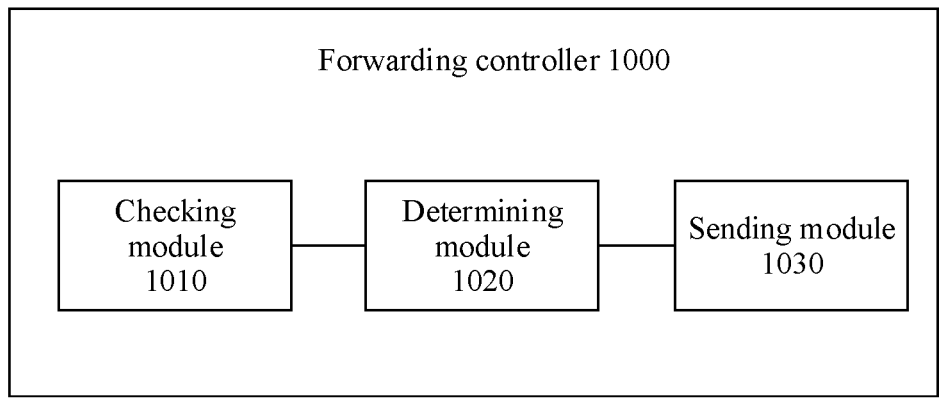
FIG. 10 is a schematic block diagram of a forwarding controller 1000 according to an embodiment.

FIG. 10 is a schematic block diagram of a forwarding controller 1000 according to an embodiment. The forwarding controller 1000 includes: a checking module 1010 configured to: check access permission and/or a forwarding policy of a first part of to-be-transmitted traffic sent by an access device, and after the check is passed, forward the first part of the to-be-transmitted traffic to a destination of the to-be-transmitted traffic; a determining module 1020 configured to: after the to-be-transmitted traffic passes the check, determine a first forwarding node based on stored network topology information and a forwarding path of the to-be-transmitted traffic; and a sending module 1030 configured to send forwarding indication information to the first forwarding node, where the forwarding indication information includes a source IP address and a destination IP address of the to-be-transmitted traffic, the forwarding indication information is used to indicate the first forwarding node to send the to-be-transmitted traffic to the destination, and a second part of the to-be-transmitted traffic is different from the first part of the to-be-transmitted traffic.

Optionally, the determining module 1020 is further configured to select, based on the network topology information and the forwarding path of the to-be-transmitted traffic, a network device that is closest to the forwarding controller as the first forwarding node on the forwarding path of the to-be-transmitted traffic.

Optionally, the determining module 1020 is further configured to select, based on the network topology information and the forwarding path of the to-be-transmitted traffic, a network device that is closest to the access device as the first forwarding node on the forwarding path of the to-be-transmitted traffic.

Optionally, the determining module 1020 is further configured to select a network device that is closest to the first forwarding node as a second forwarding node on a forwarding path from the access device to the forwarding control device. The second forwarding node is configured to forward a third part of the to-be-transmitted traffic, and the third part of the to-be-transmitted traffic is different from a first part and a second part.

Optionally, the sending module 1030 is further configured to: send forwarding stop indication information to the first forwarding node, where the forwarding stop indication information is used to indicate the first forwarding node to stop sending the third part of the to-be-transmitted traffic to the destination; and send the forwarding indication information to the second forwarding node.

Optionally, the sending module 1030 is further configured to send address indication information to the access device. The address indication information is used to indicate an address of the first forwarding node to the access device, so that the access device establishes a tunnel to the first forwarding node based on the address of the first forwarding node, and transmits the second part of the to-be-transmitted traffic to the first forwarding node through the tunnel.

Optionally, the first part of the to-be-transmitted traffic is a first packet of the to-be-transmitted traffic, or a specified quantity of data packets in the to-be-transmitted traffic, or some traffic selected from the to-be-transmitted traffic based on a preset rule.

Figure 11:
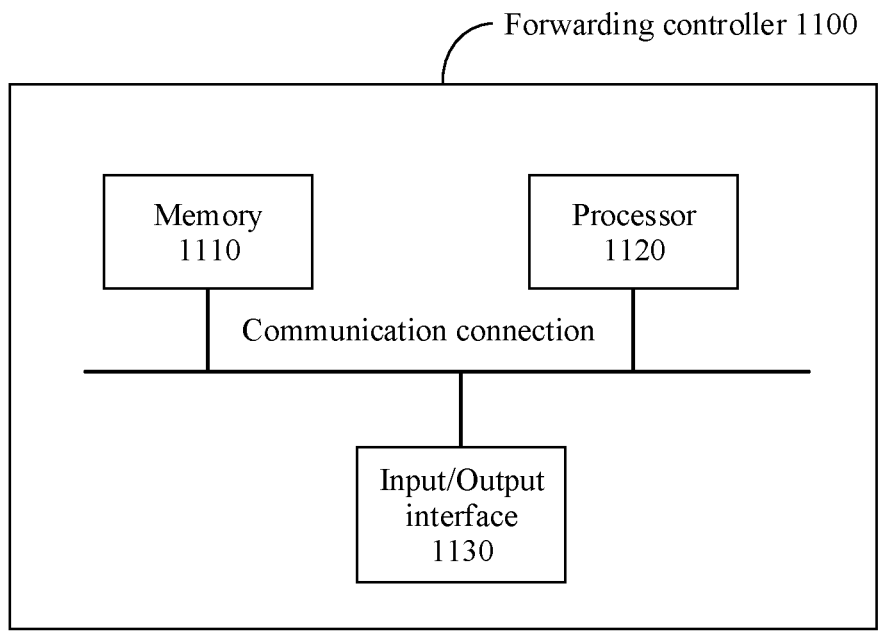
FIG. 11 is a schematic block diagram of a forwarding controller 1100 according to an embodiment.

FIG. 11 is a schematic block diagram of a forwarding controller 1100 according to an embodiment. The forwarding controller 1100 may include a memory 1110, a processor 1120, and an input/output interface 1130.

The memory 1110, the processor 1120, and the input/output interface 1130 are connected through an internal connection path. The memory 1110 is configured to store program instructions. The processor 1120 is configured to execute the program instructions stored in the memory 1110, to control the input/output interface 1130 to receive input data and information, and output data such as an operation result.

It should be understood that, in this embodiment, the processor 1120 may be a central processing unit (CPU), or the processor may further be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like. Alternatively, the processor 1120 uses one or more integrated circuits, and is configured to execute a related program, to implement the technical solutions provided in the embodiments.

The memory 1110 may include a read-only memory and a random access memory, and provide instructions and data to the processor 1120. A part of the processor 1120 may further include a non-volatile random access memory. For example, the processor 1120 may further store information of a device type.

In an implementation process, steps in the foregoing methods can be implemented by using a hardware integrated logical circuit in the processor 1120, or by using instructions in a form of software. The methods disclosed may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1110, and the processor 1120 reads information in the memory 1110 and completes the steps in the foregoing methods in combination with hardware of the processor 1120. To avoid repetition, details are not described herein again.

It should be understood that the forwarding controller 1100 according to this embodiment is configured to perform corresponding procedures of the methods shown in FIG. 2 to FIG. 7 in the embodiments. In addition, the foregoing and other operations and/or functions of the modules in the forwarding controller 1100 are separately used to implement corresponding procedures of the methods shown in FIG. 2 to FIG. 7 in the embodiments. For brevity, details are not described herein again.

It should be noted that, in the forwarding controller 1100 shown in FIG. 11, the processor 1120 may invoke a computer program in the memory 1110 to implement the steps performed by the modules. For example, the processor 1120 may invoke computer instructions stored in a cache to perform steps that need to be performed by the modules shown in FIG. 10.

Figure 12:
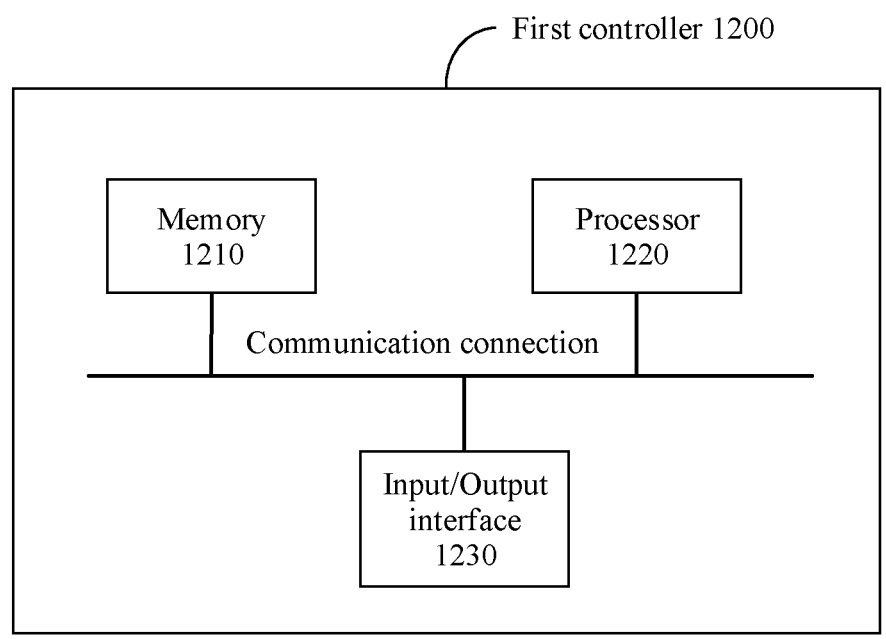
FIG. 12 is a schematic block diagram of a first controller 1200 according to an embodiment.

FIG. 12 is a schematic block diagram of a first controller 1200 according to an embodiment. The first controller 1200 may include a memory 1210, a processor 1220, and an input/output interface 1230.

The memory 1210, the processor 1220, and the input/output interface 1230 are connected through an internal connection path. The memory 1210 is configured to store program instructions. The processor 1220 is configured to execute the program instructions stored in the memory 1210, to control the input/output interface 1230 to receive input data and information, and output data such as an operation result.

The processor 1220 may be a CPU, or the processor may further be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like. Alternatively, the processor 1220 uses one or more integrated circuits, and is configured to execute a related program, to implement the technical solutions provided in the embodiments.

The memory 1210 may include a read-only memory and a random access memory, and provide instructions and data to the processor 1220. A part of the processor 1220 may further include a non-volatile random access memory. For example, the processor 1220 may further store information of a device type.

In an implementation process, steps in the foregoing methods can be implemented by using a hardware integrated logical circuit in the processor 1220, or by using instructions in a form of software. The methods disclosed with reference to the embodiments may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1210, and the processor 1220 reads information in the memory 1210 and completes the steps in the foregoing methods in combination with hardware of the processor 1220. To avoid repetition, details are not described herein again.

It should be understood that the first controller 1200 according to this embodiment is configured to perform corresponding procedures of the methods shown in FIG. 2 to FIG. 7 in the embodiments. In addition, the foregoing and other operations and/or functions of the modules in the first controller 1200 are separately used to implement corresponding procedures of the methods shown in FIG. 2 to FIG. 7 in the embodiments. For brevity, details are not described herein again.

It should be noted that, in the first controller 1200 shown in FIG. 12, the processor 1220 may invoke a computer program in the memory 1210 to implement the steps performed by the modules. For example, the processor 1220 may invoke computer instructions stored in a cache to perform steps that need to be performed by the modules shown in FIG. 9.

It should be understood that sequence numbers of the foregoing processes do not mean execution sequences in various embodiments. The execution sequences of the processes should be determined based on functions and internal logic of the processes, and should not be construed as any limitation on the implementation processes of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method for sending packet traffic and comprising:
transmitting, by an access device, to a forwarding controller, and according to a first forwarding path of to-be-transmitted traffic, a first part of the to-be-transmitted traffic for performing a check on the to-be-transmitted traffic according to a check policy, wherein the check policy is for checking access permission of the to-be-transmitted traffic or a forwarding policy of the to-be-transmitted traffic;
forwarding, by the forwarding controller, to a destination of the to-be-transmitted traffic, and after the check passes, the first part; and
transmitting, by the access device and to a first forwarding node located on the first forwarding path, a second part of the to-be-transmitted traffic for the first forwarding node to send the second part to the destination based on forwarding indication information,
wherein the forwarding indication information instructs the first forwarding node to send the to-be-transmitted traffic to the destination.

2. The method of claim 1, further comprising:
storing, by the forwarding controller, network topology information;
determining, by the forwarding controller after the check passes, the first forwarding node based on the network topology information and forwarding information of the to-be-transmitted traffic; and
sending, by the forwarding controller and to the first forwarding node, the forwarding indication information, wherein the forwarding indication information comprises the forwarding information.

3. The method of claim 2, wherein determining the first forwarding node comprises selecting, by the forwarding controller based on the network topology information and the forwarding information, a network device that is closest to the forwarding controller as the first forwarding node on the first forwarding path.

4. The method of claim 2, wherein determining the first forwarding node comprises selecting, by the forwarding controller based on the network topology information and the forwarding information, a network device that is closest to the access device as the first forwarding node on the first forwarding path.

5. The method of claim 3, further comprising selecting, by the forwarding controller, a network device that is closest to the first forwarding node as a second forwarding node on a second forwarding path from the access device to the forwarding controller for forwarding a third part of the to-be-transmitted traffic.

6. The method of claim 5, further comprising:
sending, by the forwarding controller to the first forwarding node, forwarding stop indication information instructing the first forwarding node to stop sending the third part to the destination; and
sending, by the forwarding controller to the second forwarding node, the forwarding indication information.

7. The method of claim 1, further comprising:
sending, by the forwarding controller and to the access device, address indication information indicating an address of the first forwarding node;
establishing, by the access device based on the address, a tunnel to the first forwarding node; and
further transmitting, by the access device, the second part through the tunnel.

8. The method of claim 1, further comprising:
storing, by a first controller, network topology information;
receiving, by the first controller and from the forwarding controller, check pass indication information indicating that the check has passed and comprising a source Internet Protocol (IP) address and a destination IP address;
determining, by the first controller, the first forwarding node based on the network topology information and the check pass indication information; and
sending, by the first controller to the first forwarding node, the forwarding indication information.

9. The method of claim 8, wherein determining the first forwarding node comprises selecting, by the first controller based on the network topology information, the source IP address, and the destination IP address, a network device that is closest to the forwarding controller as the first forwarding node on the first forwarding path.

10. The method of claim 8, wherein determining the first forwarding node comprises selecting, by the first controller based on the network topology information, the source IP address, and the destination IP address, a network device that is closest to the access device as the first forwarding node on the first forwarding path.

11. The method of claim 9, further comprising selecting, by the first controller, a network device that is closest to the first forwarding node as a second forwarding node on a second forwarding path from the access device to the forwarding controller for forwarding a third part of the to-be-transmitted traffic.

12. The method according to claim 11, further comprising:
sending, by the first controller to the first forwarding node, forwarding stop indication information instructing the first forwarding node to stop sending the third part to the destination; and
sending, by the first controller to the second forwarding node, the forwarding indication information.

13. The method of claim 1, wherein the first part is a first packet, a specified quantity of data packets, or traffic selected based on a preset rule.

14. A system for sending packet traffic and comprising:
a physical access device configured to:
transmit, to a forwarding controller according to a first forwarding path of to-be-transmitted traffic, a first part of the to-be-transmitted traffic for performing a check on the to-be-transmitted traffic according to a check policy, wherein the check policy is for checking access permission of the to-be-transmitted traffic or a forwarding policy of the to-be-transmitted traffic; and
transmit to a first forwarding node located on the first forwarding path, a second part of the to-be-transmitted traffic for the first forwarding node to send the second part to a destination of the to-be-transmitted traffic based on forwarding indication information,
wherein the forwarding indication information instructs the first forwarding node to send the to-be-transmitted traffic to the destination; and
the forwarding controller configured to forward the first part to the destination after the check passes.

15. The system of claim 14, wherein the forwarding controller is further configured to:
store network topology information;
determine, after the check passes, the first forwarding node based on the network topology information and forwarding information of the to-be-transmitted traffic; and
send, to the first forwarding node, the forwarding indication information, wherein the forwarding indication information comprises the forwarding information.

16. The system of claim 15, wherein the forwarding controller is further configured to further determine the first forwarding node by selecting, based on the network topology information and the forwarding information, a network device that is closest to the forwarding controller as the first forwarding node on the first forwarding path.

17. The system of claim 15, wherein the forwarding controller is further configured to further determine the first forwarding node by selecting, based on the network topology information and the forwarding information, a network device that is closest to the physical access device as the first forwarding node on the first forwarding path.

18. The system of claim 16, wherein the forwarding controller is further configured to select a network device that is closest to the first forwarding node as a second forwarding node on a second forwarding path from the physical access device to the forwarding controller for forwarding a third part of the to-be-transmitted traffic.

19. The system of claim 18, wherein the forwarding controller is further configured to:
send, to the first forwarding node, forwarding stop indication information instructing the first forwarding node to stop sending the third part to the destination; and
send, to the second forwarding node, the forwarding indication information.

20. The system of claim 14, wherein the forwarding controller is further configured to send, to the physical access device, address indication information indicating an address of the first forwarding node, and wherein the physical access device is further configured to:
establish, based on the address, a tunnel to the first forwarding node, and
further transmit the second part through the tunnel.

21. The system of claim 14, further comprising a first controller configured to:
store network topology information;
receive, from the forwarding controller, check pass indication information indicating that the check has passed and comprising a source Internet Protocol (IP) address and a destination IP address;
determine the first forwarding node based on the network topology information and the check pass indication information; and
send, to the first forwarding node, the forwarding indication information.

22. The system of claim 21, wherein the first controller is further configured to further determine the first forwarding node by selecting, based on the network topology information, the source IP address, and the destination IP address, a network device that is closest to the forwarding controller as the first forwarding node on the first forwarding path.

23. The system of claim 21, wherein the first controller is further configured to further determine the first forwarding node by selecting, based on the network topology information, the source IP address, and the destination IP address, a network device that is closest to the physical access device as the first forwarding node on the first forwarding path.

24. The system of claim 22, wherein the first controller is further configured to select a network device that is closest to the first forwarding node as a second forwarding node on a second forwarding path from the physical access device to the forwarding controller for forwarding a third part of the to-be-transmitted traffic.

25. The system of claim 24, wherein the first controller is further configured to:
 send, to the first forwarding node, forwarding stop indication information instructing the first forwarding node to stop sending the third part to the destination; and
 send, to the second forwarding node, the forwarding indication information.

26. The system of claim 14, wherein the first part is a first packet, a specified quantity of data packets, or traffic selected based on a preset rule.

27. An access device comprising:
 a physical memory configured to store program instructions; and
 a processor coupled to the physical memory and configured to execute the program instructions to cause the access device to:
  transmit, to a forwarding controller according to a first forwarding path of to-be-transmitted traffic, a first part of the to-be-transmitted traffic for performing a check on the to-be-transmitted traffic according to a check policy and for forwarding the first part to a destination of the to-be-transmitted traffic after the check passes, wherein the check policy is for checking access permission of the to-be-transmitted traffic or a forwarding policy of the to-be-transmitted traffic; and
  transmit to a first forwarding node located on the first forwarding path, a second part of the to-be-transmitted traffic for the first forwarding node to send the second part to the destination based on forwarding indication information,
 wherein the forwarding indication information instructs the first forwarding node to send the to-be-transmitted traffic to the destination.

28. A computer program product comprising instructions that are stored on a non-transitory computer-readable medium and that, when executed by a processor, cause an access device to:
 transmit, to a forwarding controller according to a first forwarding path of to-be-transmitted traffic, a first part of the to-be-transmitted traffic for performing a check on the to-be-transmitted traffic according to a check policy and for forwarding the first part to a destination of the to-be-transimitted traffic after the check passes, wherein the check policy is for checking access permission of the to-be-transmitted traffic or a forwarding policy of the to-be-transmitted traffic;
 transmit to a first forwarding node located on the first forwarding path, a second part of the to-be-transmitted traffic for the first forwarding node to send the second part to the destination based on forwarding indication information,
 wherein the forwarding indication information instructs the first forwarding node to send the to-be-transmitted traffic to the destination.

* * * * *